L. P. Rider,
Ships Form.
No. 107,961. Patented Oct. 4, 1870.
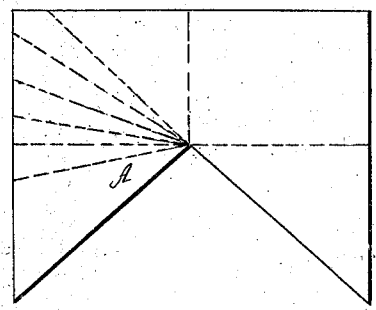
Fig. 1.
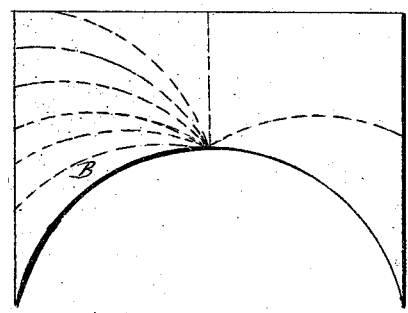
Fig. 2.
Fig. 3.
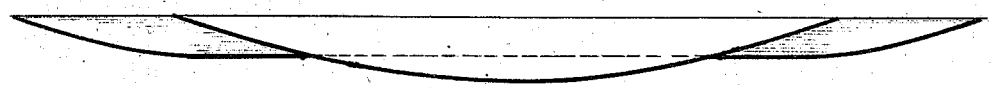
Fig. 4.
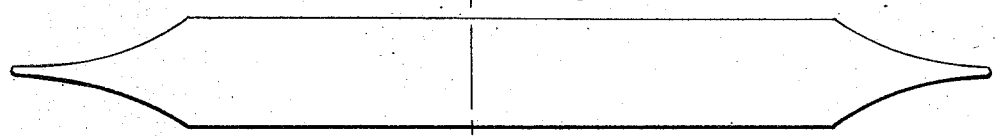
Fig. 5.
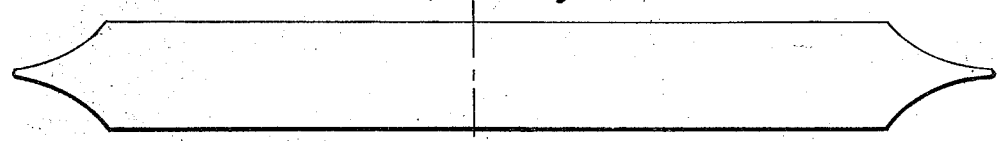
Witnesses:
John Becker
D. S. Mabee
Inventor:
L. P. Rider
Per Munn & Co.
Attorneys.
N. PETERS, PHOTO-LITHOGRAPHER, WASHINGTON, D. C.

L. P. Rider,
Ships' Form.

No. 107,961.   Patented Oct. 4, 1870.

2 Sheets, Sheet 2.

L. P. Rider, Inventor

Witnesses
H. J. Fitch
A. M. Panner by
His Attorneys.

United States Patent Office.

LEMAN P. RIDER, OF PITTSBURG, PENNSYLVANIA, ASSIGNOR TO HIMSELF, WILLIAM YAGLE, AND A. WARD, OF SAME PLACE.

Letters Patent No. 107,961, dated October 4, 1870.

IMPROVEMENT IN HULLS OF VESSELS.

The Schedule referred to in these Letters Patent and making part of the same.

*To all whom it may concern:*

Be it known that I, LEMAN P. RIDER, of Pittsburg, in the county of Allegheny and State of Pennsylvania, have invented a new and useful Improvement in Boat-Hulls; and I do hereby declare that the following is a full, clear, and exact description thereof, which will enable others skilled in the art to make and use the same, reference being had to the accompanying drawing forming part of this specification.

My invention relates to the construction of the hulls of ships, boats, or vessels; and My object is to cause the liquid displaced by the cut-water to be gathered convergingly under the center of the boat, and to be thence divergingly passed over at the stern, in order to retain the boat in a horizontal position, and thereby facilitate its motion through the water.

Figures 1 and 2 are cross-sections of the hull upon a central plane, showing modifications, one with straight and the other with curved inclines.

Figure 3 is a side view.

Figures 4 and 5 are plan views.

A in fig. 1 represents the transverse angle at the center, while

B, fig. 2, represents a curve, forming an arc instead of an angle.

Figure 6:
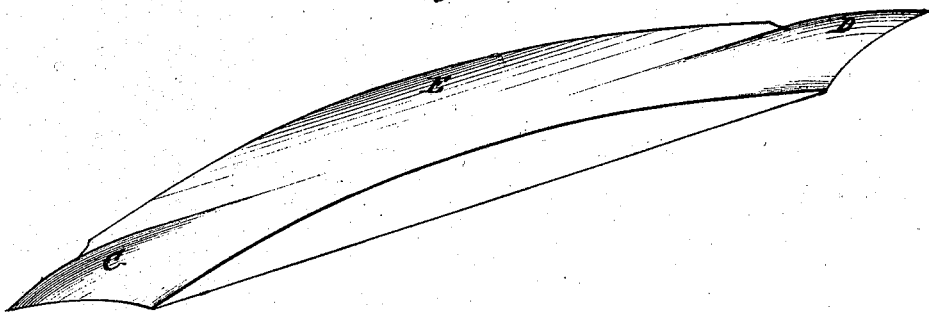
Figure 6 is a perspective view of the bottom of the hull.
Figure 7:
Figure 7 is an end view.

C, fig. 6, is the cut-water; and

D is a reversed counterpart thereof at the stern.

E is a central chamber, commencing where the cut-water ends, (and ceases to displace the water,) and terminating where the counterpart begins to separate the volume of water from the central chamber. The opposite sides of chamber E incline, gradually attaining their maximum at the center, where the depth also is greatest.

The mode of operation is as follows:

The volume of water displaced by the inclined sides of the cut-water is converged, as the boat moves along, by the reversely-inclined sides of chamber E, until united therein at the center. The further progress of the boat brings the reversed cut-water over the united mass of fluid. It is then laterally divided, at first by a very obtuse angle, or the arc of a very large circle, which gradually becomes more and more acute or diminished.

The volume of water displaced being converged by the gradually-converging sides of chamber E, to quickly fill up the trough made by the cut-water, a firm support is furnished to the boat in the line of its center of gravity, which renders it steady and unwavering in its position.

An upward pressure being produced at the stern, in passing over the volume of water from chamber E, equal to the upward pressure of the water upon the moving sides of the cut-water, there is no tendency of the boat to rock on the center, and to be raised higher at the prow than at the stern. The boat thus sits equably, and in a horizontal plane upon the water, and rides buoyantly at any speed which may be given.

In all well-proportioned boats, constructed on any other principle, the pressure of water upon the inclined sides of the cut-water throw up the prow and down the stern. The incline thus formed, however small, causes the boat to be propelled up hill, instead of on a constant level. Under these circumstances, the power is compelled to lift a considerable percentage of the weight, as well as to carry it forward.

Having thus described all that is necessary to a full understanding of my invention,

What I esteem as new, and desire to protect by Letters Patent, is—

The cut-water C and its reversed counterpart D, combined with central chamber E, as and for the purpose described.

LEMAN P. RIDER.

Witnesses:
I. H. HILLERMAN,
C. H. LOVE.